Figure 1:
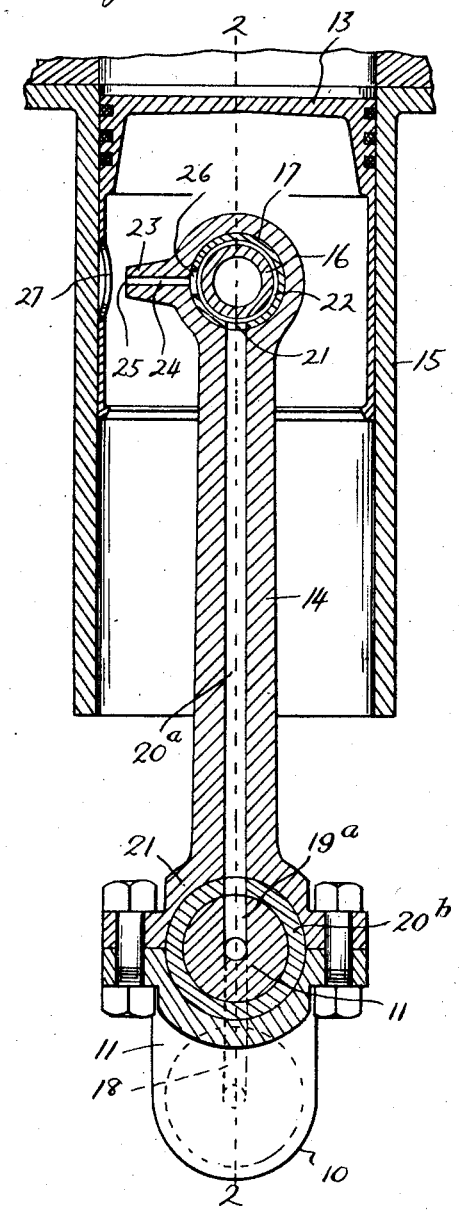

July 19, 1927.

C. W. VAN RANST 1,636,021

LUBRICATING MEANS FOR MOTOR CAR PISTONS

Filed April 27, 1925

Inventor
Cornelius W. Van Ranst

By Whittemore Hulbert Whittemore
+Belknap    Attorneys

Patented July 19, 1927.

1,636,021

UNITED STATES PATENT OFFICE.

CORNELIUS W. VAN RANST, OF DETROIT, MICHIGAN.

LUBRICATING MEANS FOR MOTOR-CAR PISTONS.

Application filed April 27, 1925. Serial No. 26,263.

The invention relates to internal combustion engines and refers more particularly to means for lubricating the cylinder walls of the engine. The invention is particularly adapted, though not necessarily limited to internal combustion engines employing aluminum or other alloyed pistons. In the use of such pistons which have a co-efficient of expansion differing from that of the cylinder from which they operate, it has been found that because of the difference of co-efficience of expansion, the piston tends to freeze or bind in the cylinder. This binding action is objectionable in lowering the efficiency because of resulting scoring of the cylinder walls and other damage to the engine. The binding of the pistons is especially noticed in initially starting the engine and it is an object of the present invention to automatically apply a lubricant directly to the point of binding between the piston and the cylinder.

It is a further object of my invention to provide a device of the character stated of simple construction and of comparatively few parts rendering the device capable of being manufactured cheaply.

A further feature of the invention resides in providing means for lubricating the connecting rod bearing with the crank shaft and wrist pin.

With these and other objects in view, the invention resides in the novel features of construction and combination and arrangements of parts as more fully hereinafter described and claimed.

Referring to the drawings:—

Figure 2:
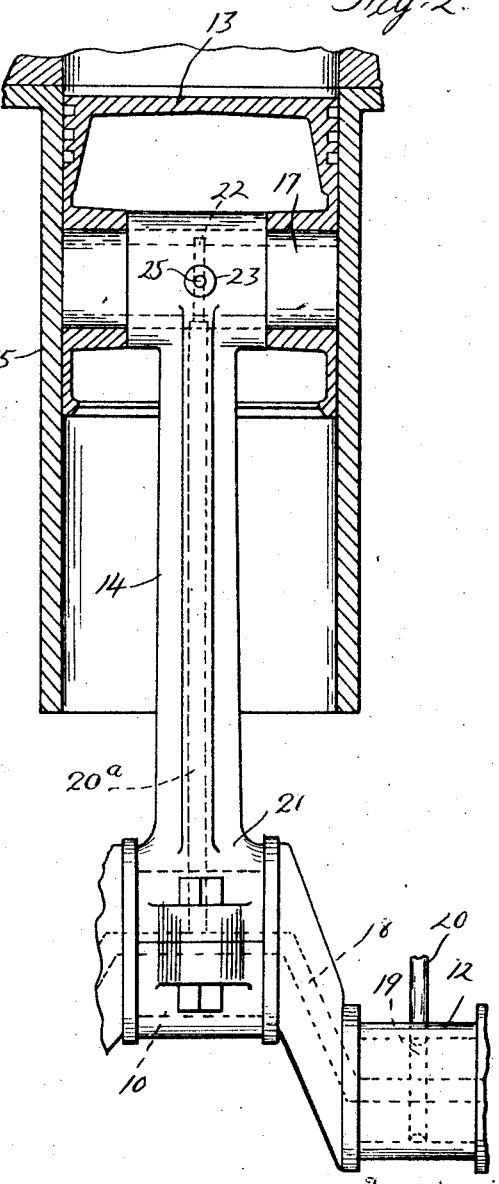

Figure 1 is a fragmentary view in perspective showing my invention applied to a cylinder and piston and parts associated therewith; and Figure 2 is an elevation view in cross section along the line 2—2 of Figure 1.

Referring to the drawings in which like reference characters indicate corresponding parts, reference character 10 indicates a crank shaft of an internal combustion engine, 11 being one of the cranks thereof. The crank shaft may be mounted in accordance with the usual construction in suitable bearings 12. 13 represents a piston movable from the crank shaft by a connecting rod 14 in the cylinder 15. The connecting rod 14 is pivotally connected with the piston by a wrist pin 16, 17 indicating a bushing or the like surrounding the wrist pin.

A bore or passage 18 is formed through the crank shaft and is provided with a radial part 19 for communication with a suitable source of lubricant supplied under pressure by reason of the supply pipe 20. The lubricant passage 18 is also formed with a radially extending portion 19$^a$ adapted to intermittently register with a boring or passage 20$^a$ provided longitudinally of the connecting rod 14 as the crank 11 rotates within the bearing portion 21 of the connecting rod. 20$^b$ represents a bushing between the connecting rod and crank, this bushing being also provided with a passage forming a continuation of the passage 20$^a$ as shown in Figure 1. The connecting rod passage 20$^a$ communicates through an opening 21 in the bushing 17 with a circumferentially extending groove 22 which surrounds or partially surrounds the wrist pin 16. 23 is a lubricant discharge nozzle which may be formed integrally with the connecting rod 14 and may be provided with a substantially horizontally extending lubricant conducting passage 24 terminating in a discharge opening 25. Lubricant from the groove 22 is supplied to the passage 24 through a second opening 26 in the bushing 17. 27 represents an opening extending transversely through the skirt of the piston 13 whereby the lubricant discharged from the nozzle 23 may pass through the opening 27 and strike the wall of the cylinder 15.

In operation lubricant under pressure is supplied through pipe 20 and passage 18 to the radially extending portion 19$^a$ whence it is intermittently supplied to the connecting rod passage 20$^a$ by reason of the rotation of the crank 11 within the connecting rod bearing 21. From the passage 20$^a$ the lubricant passes through the groove 22 to the passage 24 of the nozzle 23 where it is discharged through the piston opening 27 to impinge upon the wall of the cylinder 15. In this manner the lubricant is discharged directly to the cylinder wall at the point where it will serve to prevent freezing or binding of the piston within the cylinder. While the invention is adapted for use in all types of internal combustion engines it will be found especially useful where pistons are used which are constructed of a material having a greater co-efficient of expansion than the cylinder. In such construction, should the piston expand radially at a greater rate than the cylinder, the lubricant discharge from the nozzle 23 will serve to lubricate the cylinder wall and prevent binding of the piston in the cylinder.

It will further be noted that the lubricating oil in passing to the wall of the cylinder will also lubricate the bearing for the bushing 17 and the wrist pin 16 by reason of the oil groove 22. Lubrication of the crank shaft bearings and the connecting rod bearing with the crank shaft is also afforded.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. The combination with an internal combustion engine comprising a piston, a crank shaft and connecting rod, of a source of lubricant under pressure, said piston having an opening, a discharge nozzle within the piston and spaced from the bounding walls of said piston opening, said nozzle being directed toward said opening, and means for conducting the lubricant from said source through the crank shaft and connecting rod for discharge through said piston opening to lubricate the cylinder wall.

2. The combination with an internal combustion engine having a piston formed with an opening, of a nozzle spaced from the bounding walls of said opening and directed toward said opening, and means for conducting a lubricant under pressure to said nozzle for discharge through said piston opening to lubricate the cylinder wall.

3. The combination with an internal combustion engine having a piston formed with an opening, of a nozzle having a discharge end spaced from the piston walls, said nozzle being positioned substantially horizontally and directed toward said opening, and means for conducting a lubricant under pressure to said nozzle for discharge through said piston opening to lubricate the cylinder wall.

4. The combination with an internal combustion engine having a piston formed with an opening, of a nozzle positioned substantially horizontally and directed toward said opening, the discharge end of said nozzle being spaced from the piston opening, and means for conducting a lubricant under pressure to said nozzle for discharge through said piston opening to lubricate the cylinder wall.

5. The combination with an internal combustion engine comprising a piston and connecting rod actuated thereby, said piston having an opening, of a nozzle mounted to rock with the connecting rod and directed toward said opening, and means for conducting a lubricant under pressure to said nozzle for discharge through said piston opening to lubricate the cylinder wall.

6. The combination with an internal combustion engine comprising a piston and connecting rod actuated thereby, said piston having an opening, of a nozzle mounted to rock with the connecting rod and positioned substantially horizontally and directed toward said opening, the discharge end of said nozzle being spaced from the piston opening, and means for conducting lubricant under pressure at said opening for discharge through said piston opening to lubricate the cylinder wall.

7. The combination with an internal combustion engine comprising a piston provided with an opening, a crank shaft and a connecting rod, of a source of lubricant under pressure, a nozzle having its discharge end spaced from the piston opening, said crank shaft, connecting rod and nozzle being provided with communicating lubricant passages and means for conducting a lubricant under pressure through said passages to the nozzle for discharge through said piston opening to lubricate the cylinder wall.

8. The combination with an internal combustion engine comprising a piston provided with an opening, a crank shaft and a connecting rod, of a source of lubricant under pressure, a nozzle positioned substantially horizontally and directed toward said opening, the discharge end of said nozzle being spaced from said opening, said crank shaft, connecting rod and nozzle being provided with communicating lubricant passages, and means for conducting a lubricant under pressure through said passages to the nozzle for discharge through said piston opening to lubricate the cylinder wall.

9. The combination with an internal combustion engine comprising a piston provided with an opening, a crank shaft and a connecting rod, of a source of lubricant under pressure, a nozzle mounted to rock with the conecting rod and directed substantially horizontally toward said opening, said crank shaft, conecting rod and nozzle being provided with communicating lubricant passages, and means for conducting a lubricant under pressure through said passages to the nozzle for discharge to the said piston opening to lubricate the cylinder wall.

10. In an internal combustion engine provided with an aluminum or other alloyed piston, said piston provided with an opening and having a co-efficient of expansion differing from that of the cylinder within which the piston operates, of a nozzle directed toward said opening, a source of lubricant under continuous pressure and means for intermittently establishing communication between said lubricant under pressure and said nozzle for discharging the lubricant through said opening to lubricate the cylinder wall to prevent binding of the piston within the cylinder.

11. The combination with an internal combustion engine having a piston formed with an opening, of a nozzle directed toward said opening, a source of lubricant under continuous pressure, and means for intermittently conducting the lubricant under pressure to said nozzle for discharge through said piston opening to lubricate the cylinder wall.

12. The combination with an internal combustion engine having a piston formed with an opening, of a nozzle directed toward said opening, a source of lubricant under continuous pressure and means for intermittently conducting the lubricant under pressure to said nozzle for discharge through said piston opening to lubricate the cylinder wall, and means for lubricating the wrist pin bearing by the lubricant in its path of travel to the said nozzle.

13. The combination with an internal combustion engine having a piston formed with an opening, of a source of lubricant under continuous pressure and means for intermittently establishing communication between said source of lubricant and said opening for discharging the lubricant through the said opening to lubricate the cylinder wall.

14. The combination with an internal combustion engine having a piston provided with an opening, a crank shaft, and a connecting rod, of a source of lubricant under continuous pressure and means for intermittently permitting a discharge of the lubricant through the opening in the piston to lubricate the cylinder wall, the periods of lubrication being controlled by the rotation of the said crank shaft.

In testimony whereof I affix my signature.

C. W. VAN RANST.